(12) United States Patent
Wiseman et al.

(10) Patent No.: US 8,447,661 B2
(45) Date of Patent: May 21, 2013

(54) QUERY ANALYSIS FOR GEOGRAPHIC-BASED LISTING SERVICE

(75) Inventors: Garry R Wiseman, Snoqualmie, WA (US); Mark Atherton, Ware (GB)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 13/307,686

(22) Filed: Nov. 30, 2011

(65) Prior Publication Data

US 2012/0078754 A1    Mar. 29, 2012

Related U.S. Application Data

(60) Division of application No. 11/267,966, filed on Nov. 7, 2005, now Pat. No. 8,090,620, which is a continuation of application No. 11/267,874, filed on Nov. 4, 2005, now Pat. No. 7,840,558.

(51) Int. Cl.
*G06Q 30/00* (2006.01)
(52) U.S. Cl.
USPC ...................................................... 705/26.1
(58) Field of Classification Search
USPC ...................................................... 705/26.1
See application file for complete search history.

(56) References Cited

U.S. PATENT DOCUMENTS

| | | | |
|---|---|---|---|
| 6,134,548 A | 10/2000 | Gottsman et al. | |
| 6,618,822 B1 | 9/2003 | Loaiza et al. | |
| 7,590,619 B2 * | 9/2009 | Hurst-Hiller et al. | 1/1 |
| 2002/0002899 A1 | 1/2002 | Gjerdingen et al. | |
| 2002/0055924 A1 | 5/2002 | Liming | |
| 2002/0143462 A1 | 10/2002 | Warren | |
| 2003/0061211 A1 * | 3/2003 | Shultz et al. | 707/3 |
| 2004/0139049 A1 | 7/2004 | Hancock et al. | |
| 2004/0210602 A1 | 10/2004 | Hillis et al. | |
| 2004/0267691 A1 | 12/2004 | Vasudeva | |
| 2005/0004889 A1 | 1/2005 | Bailey et al. | |
| 2005/0027666 A1 | 2/2005 | Beck, Jr. et al. | |
| 2005/0060162 A1 | 3/2005 | Mohit et al. | |
| 2005/0289039 A1 | 12/2005 | Greak | |
| 2006/0015435 A1 | 1/2006 | Nathanson | |
| 2006/0095431 A1 | 5/2006 | Nash | |
| 2006/0112123 A1 | 5/2006 | Clark et al. | |
| 2006/0184625 A1 * | 8/2006 | Nordvik et al. | 709/204 |
| 2006/0224662 A1 | 10/2006 | Richardson et al. | |
| 2008/0281705 A1 * | 11/2008 | Solomon | 705/14 |

OTHER PUBLICATIONS

OA dated May 1, 2008 for U.S. Appl. No. 11/267,874, 17 pages.
OA dated Oct. 7, 2008 for U.S. Appl. No. 11/311,813, 29 pages.

(Continued)

*Primary Examiner* — Mila Airapetian
(74) *Attorney, Agent, or Firm* — Shook Hardy & Bacon L.L.P.

(57) ABSTRACT

A unique system and method facilitates analyzes searches or queries that are geographic based. In particular, a user can submit a geo-tag based search for items posted on a listing service according to the item's location or geo-tag information. The geo-tag information for each item can be approximate such as the city, state, or zip code or more specific such as the street address where the item is located. The amount of geo-tag information disclosed to any other user can depend on the type of item being offered. Geo-tag information is analyzed to facilitate determining item matches. In addition, users that post items can employ query results to analyze the quality of their items such as from the buyer's perspective.

18 Claims, 16 Drawing Sheets

OTHER PUBLICATIONS

OA dated Nov. 19, 2008 for U.S. Appl. No. 11/267,874, 17 pages.
OA dated Nov. 26, 2008 for U.S. Appl. No. 11/267,966, 14 pages.
OA dated Feb. 19, 2009 for U.S. Appl. No. 11/267,874, 18 pages.
OA dated Jun. 29, 2009 for U.S. Appl. No. 11/267,966, 12 pages.
OA dated Aug. 17, 2009 for U.S. Appl. No. 11/267,874, 17 pages.
OA dated Dec. 15, 2009 for U.S. Appl. No. 11/267,966, 16 pages.
OA dated Jan. 25, 2010 for U.S. Appl. No. 11/267,874, 23 pages.
OA dated Jun. 24, 2010 for U.S. Appl. No. 11/267,966, 15 pages.
OA dated Feb. 15, 2011 for U.S. Appl. No. 11/267,966, 6 pgs.
Request for Information: Office Supply Vendor in Northern California Commerce Business Daily. Washington: Dec. 26, 2001, p. 1 http://proquest.umi.com/pqdweb?did=96779983&sid=11&Fmt=3&clieentld=19648&RQT=309&VName=PQD.

* cited by examiner

QUERY ANALYSIS FOR GEOGRAPHIC-BASED LISTING SERVICE

CROSS REFERENCE TO RELATED APPLICATION

This application is a divisional of co-pending U.S. application Ser. No. 11/267,966, filed Nov. 7, 2005 and now issued as U.S. Pat. No. 8,090,620, entitled GEO-TAGGED BASED LISTING SERVICE AND MAPPING ENGINE, the entirety of which is incorporated herein by reference, which is a continuation of U.S. Application Ser. No. 11/267,874, filed Nov. 4, 2005 entitled GEO-TAGGED BASED LISTING SERVICE AND MAPPING ENGINE, now issued as U.S. Pat. No. 7,840,558, the entirety of which is incorporated herein by reference.

BACKGROUND

Buying and selling merchandise and services via the Internet has become more widely accepted and more secure in recent years. Aside from established merchants and commercial retailers, individuals have found a marketplace online for shopping or peddling their new or used merchandise as well as seeking or offering a variety of services. Many employers seeking employees and those seeking employment have turned to the Internet for opportunities. Generally speaking, this marketplace can be referred to as an online classifieds listing and many websites specializing in this type of commerce currently exist. Most notably, EBay and Craig's List are two of the more popular sites. However, national sites such as EBay lack the level of personalization that may be more closely associated with some more parochial sites such as Craig's List. For example, EBay has traditionally focused on the ability to hold auctions across the country while Craig's List has currently adopted a message board type of framework that has a more local feel, but limits users to search only a particular metropolitan area. On either site, users are left wanting more. The national site can be too large-scale and intimidating for new or infrequent users. On the contrary, the more local based site may seem too restricted in terms of the scope and ability to attract buyers and sellers.

In addition to these concerns, many of the current sites tend to either charge relatively high transaction fees or have difficulties in maintaining or increasing traffic to their sites due to other restrictions or limitations associated therewith. High fees make it less desirable for infrequent sellers to take advantage of the online service and frequent sellers worry about decreasing traffic to the site due to the higher prices needed to cover the ever-increasing transaction fees.

SUMMARY

The following presents a simplified summary in order to provide a basic understanding of some aspects of the systems and/or methods discussed herein. This summary is not an extensive overview of the systems and/or methods discussed herein. It is not intended to identify key/critical elements or to delineate the scope of such systems and/or methods. Its sole purpose is to present some concepts in a simplified form as a prelude to the more detailed description that is presented later.

The subject application relates to a system(s) and/or methodology that facilitate searching through an online classifieds database or store according to an item's (geographic) location. In particular, an item such as any good or service for sale, lease, donation, or otherwise can be tagged or labeled according to its geographic reference. This can be accomplished in part by translating the item's address location into latitude and longitude which provides a more specific point of reference than merely relying on or using the town name. Thus, the item's location can be more accurately mapped out and generalized if necessary to maintain some privacy for the user. A user can then search for desired items based at least in part upon their geographic references.

Due to security and user safety concerns, the type or amount of information regarding an item's location can be restricted at the discretion of the listing party (e.g., seller) depending on the shopper's identity and/or the kind of item being listed. Therefore, when disclosing the item's location to a potential buyer or the public in general, the location can be approximate and thus include limited information such as the region (e.g., New England area, southwest, northwest, etc. parts of the country), time zone, city, or state.

The system and method also provide for dynamically mapping search results according to the geographic references of the returned items. More specifically, when one or more items are included in a user's search results, these items can be mapped and viewed according to their location with respect to each other and/or with respect to the user's location. In addition to providing a map indicating the item's approximate or exact location, the system and method can also give directions to the user. The directions can include the most efficient route between the user and one or more items or the most efficient route for getting to all or only the selected items.

When the location of the item is important to the decision of whether to purchase, rent, or lease the item, this mapping feature can be quite powerful and effective in providing the user with additional information about the item. In particular, surrounding areas, roads, highways, intersections, shopping conveniences, schools, and/or businesses in the vicinity of the item can be viewed and then indirectly used to further narrow down the number of items of interest to the user. For example, a shopper may be interested in knowing that a major outdoor shopping plaza and a busy intersection are located around the corner from two out of three vacation homes he/she is considering to rent for the summer. Assuming that these features are not desirable to the shopper, having this information can allow the shopper to eliminate these two homes from the results page. Time is also saved for the shopper since he/she did not have to wait for the seller to respond to emails or phone messages. Thus, even though these two homes may have satisfied the shopper's criteria such as beach location, number of bedrooms and total square footage, their actual location according to the map indicates that they are too close to high-traffic roads.

Items may be updated or added to the online classifieds service constantly, however, users interested in looking and buying, for example, may not have the time to constantly perform searches to see if any new items have been posted. According to one aspect of the system and method, the user can set one or more preferences to receive alerts regarding preferred items, preferred sellers, and preferred geo-tags, or any combination thereof. The alerts can be sent via email or instant message as determined by the user.

To the accomplishment of the foregoing and related ends, certain illustrative aspects of the invention are described herein in connection with the following description and the annexed drawings. These aspects are indicative, however, of but a few of the various ways in which the principles of the invention may be employed and the subject invention is intended to include all such aspects and their equivalents. Other advantages and novel features of the invention may become apparent from the following detailed description of the invention when considered in conjunction with the drawings.

BRIEF DESCRIPTION OF THE DRAWINGS

FIG. 8 is a screenshot of an exemplary user interface for an online classifieds service which depicts an exemplary grouping of listings and quick categories from which a user can select to optimize his/her shopping experience.

FIG. 9 is a screenshot of an exemplary user interface of search results provided by an online classifieds service in the form of a list wherein the results returned to the user are based at least in part upon the geographic references of the items for sale.

DETAILED DESCRIPTION

Figure 1:
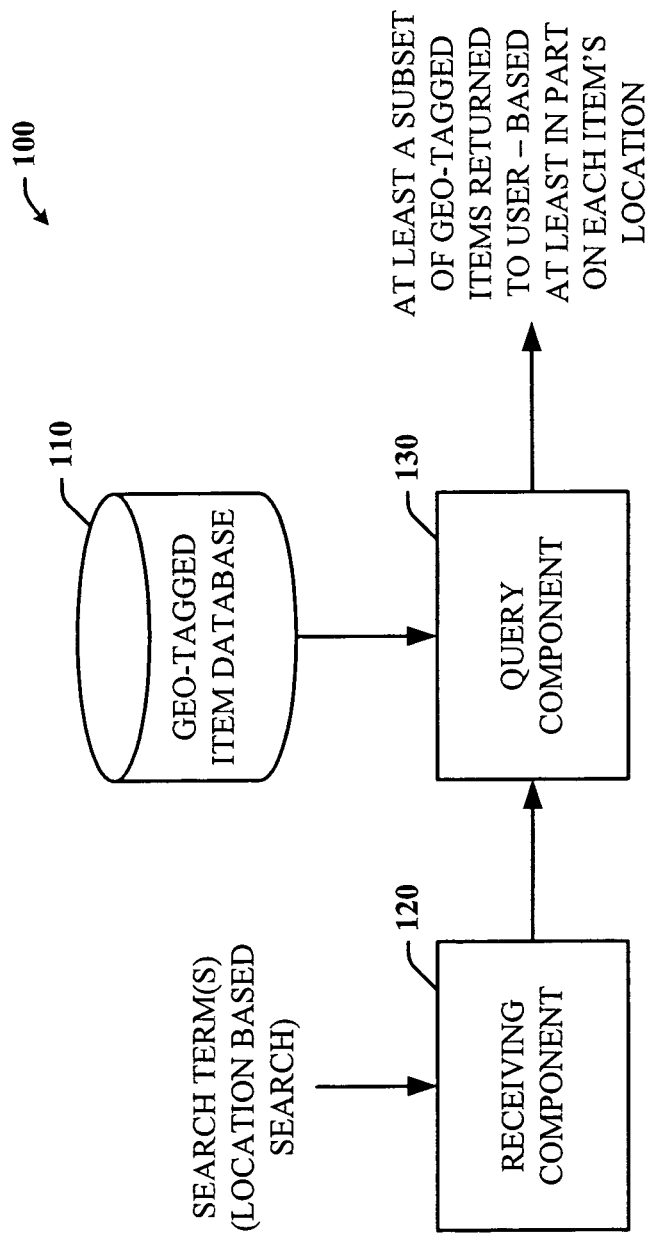
FIG. 1 is a block diagram of a location-based search system that facilitates searching of items for sale depending at least in part on the items' locations in connection with an online classifieds marketplace.

The subject systems and/or methods are now described with reference to the drawings, wherein like reference numerals are used to refer to like elements throughout. In the following description, for purposes of explanation, numerous specific details are set forth in order to provide a thorough understanding of the systems and/or methods. It may be evident, however, that the subject systems and/or methods may be practiced without these specific details. In other instances, well-known structures and devices are shown in block diagram form in order to facilitate describing them.

As used herein, the terms "component" and "system" are intended to refer to a computer-related entity, either hardware, a combination of hardware and software, software, or software in execution. For example, a component may be, but is not limited to being, a process running on a processor, a processor, an object, an executable, a thread of execution, a program, and a computer. By way of illustration, both an application running on a server and the server can be a component. One or more components may reside within a process and/or thread of execution and a component may be localized on one computer and/or distributed between two or more computers.

The subject systems and/or methods can incorporate various inference schemes and/or techniques in connection with dynamically mapping search results and automatically eliminating or canceling an item included in the search results based on any number of parameters or conditions learned by the system and/or method. For example, the system can determine based on the user's historical behavior that any house located near railroad tracks or a school can be discarded from the search results even though such houses may have the features desired by the user (e.g., number of bedrooms, bathrooms, square footage, and price range). The "discarded" items can be distinguished from the others in a visual manner but remain included in the search results. Alternatively, they can be removed from the search results with or without informing the user. Inference schemes can also be employed in connection with performing searches. For example, suppose a user frequently searches for antique baby furnishings. The system and/or method can monitor and/or analyze the baby items most often selected and/or purchased by the user and then automatically perform searches. In addition, any items in the search results from the user's "preferred" sellers or geo-tags can be highlighted or otherwise emphasized to quickly grab the user's attention.

As used herein, the term "inference" refers generally to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources.

As previously mentioned, current online classifieds services exist such as EBay and Craig's List. In particular, EBay tends to focus on nationwide auctions wherein sellers incur ever-increasing transaction and handling fees. In most cases, these high fees are incorporated into the price of the item or the shipping charge and then are passed onto the buyer. Buyers, in general, seem to be aware of these hidden fees and as a result, traffic for sellers can often wane or remain static, both of which may be displeasing especially to those sellers held captive by the larger, national auction sites. Craig's List, on the other hand, tends to cater purely to local areas, thus the selection of goods or services from which to choose can be more limited, and the amount of traffic can be somewhat fixed as well. In addition, there may be less sophistication in the format or style of such local online sites, leaving both buyers and sellers perhaps a bit frustrated overall with their various limitations.

As described herein, the systems and/or methods provide for an online marketplace suitable for any type of user, buyer, or seller that can incorporate a plurality of existing social communications networks to increase traffic and the user experience in general. By developing and employing rich user interfaces and powerful search mechanisms, a local everywhere atmosphere can be created. This online marketplace can be effectively utilized by users wishing to buy or sell items, for example, within their neighborhoods or across the country with the same relative ease and convenience. Unlike the conventional sites, transactional and handling fees in this marketplace may be excluded such as for basic or standard listings, which is ideal for the less frequent seller and even better for the high volume seller. Naturally, fewer fees for the seller can translate to lower prices for the buyer. This can lead to a greater selection or quantity of items listed and/or increased traffic.

Unlike the current online services, this online marketplace makes use of a location-based search system 100 as shown in FIG. 1 that focuses on the geographic reference of a listed or posted item. The system 100 includes a database 110 that stores item listings as entered by their respective owners or sellers. The items listed for purchase, lease, exchange, or otherwise (e.g., free) can include nearly any type of good, service, employment opportunity, and/or event. At a minimum, sellers are required to include at least one of a city, state, or zip code to identify the location of the listed item. The system can translate this data into a combination of latitude and longitude coordinates, which serves as the item's geo-tag. It should be appreciated that the geo-tag can include other systems of referencing points on Earth including but not limited to Cartesian X, Y, Z coordinates and all or substantially all projections into 2D or 3D space, such as the Universal Transverse Mercator projection. The geo-tag allows the user to search for items based on their location. When search terms are entered and then received by a receiving component 120, a query component 130 can process the search terms and then retrieve any geo-tagged items from the database 110 that satisfy the search terms. As a result, at least a subset of geo-tagged items can be returned to the user.

In practice, imagine that a water sport enthusiast living in Corpus Christi is looking for a new or used personal watercraft but would prefer to test it out himself before buying. He has close friends and family in Austin, Houston, and Galveston and therefore would be willing to look in these cities as well as his own since he would have a place to stay for free in those cities. He can perform one or more searches based at least in part on his location preferences and view the results accordingly. Although there may be some items that satisfy his preferences as to model, price, age, and apparent condition in other states or areas in Texas, he wants to test the water craft himself and traveling expenses to do so may be too high. Hence, limiting the items to be searched based on location or geographic reference can save the user valuable time and effort.

Safety concerns and security risks on the part of the seller are important and should be considered at all times and ensured in order to attract new sellers and keep current or previous sellers from going elsewhere. However, divulging the item's address or the seller's exact location can cause the seller to feel less anonymous and more vulnerable to any undesirable contact from strangers. To mitigate such concerns, the system 100 can determine how much location information, if any, should be disclosed to the buyer (or potential buyer). This determination can depend in large part upon the type of item. For instance, if the item is a car, providing the address where the car is stored or parked to any shopper can compromise the security of the car. That is, it could be stolen or otherwise damaged. Rather, the car's precise location may be revealed only to those shoppers who are considered a true potential buyer by the seller. However, when listing an upcoming garage sale, the complete address is preferable, if not necessary, to get buyers to the sale.

In some cases, the seller's location may not be relevant to making the sale such as when the good or service is internet-based (e.g., downloadable software). The seller's items can still be searched based on the items' geo-tags, however, the geo-tag information may not be revealed to any other users.

Figure 2:
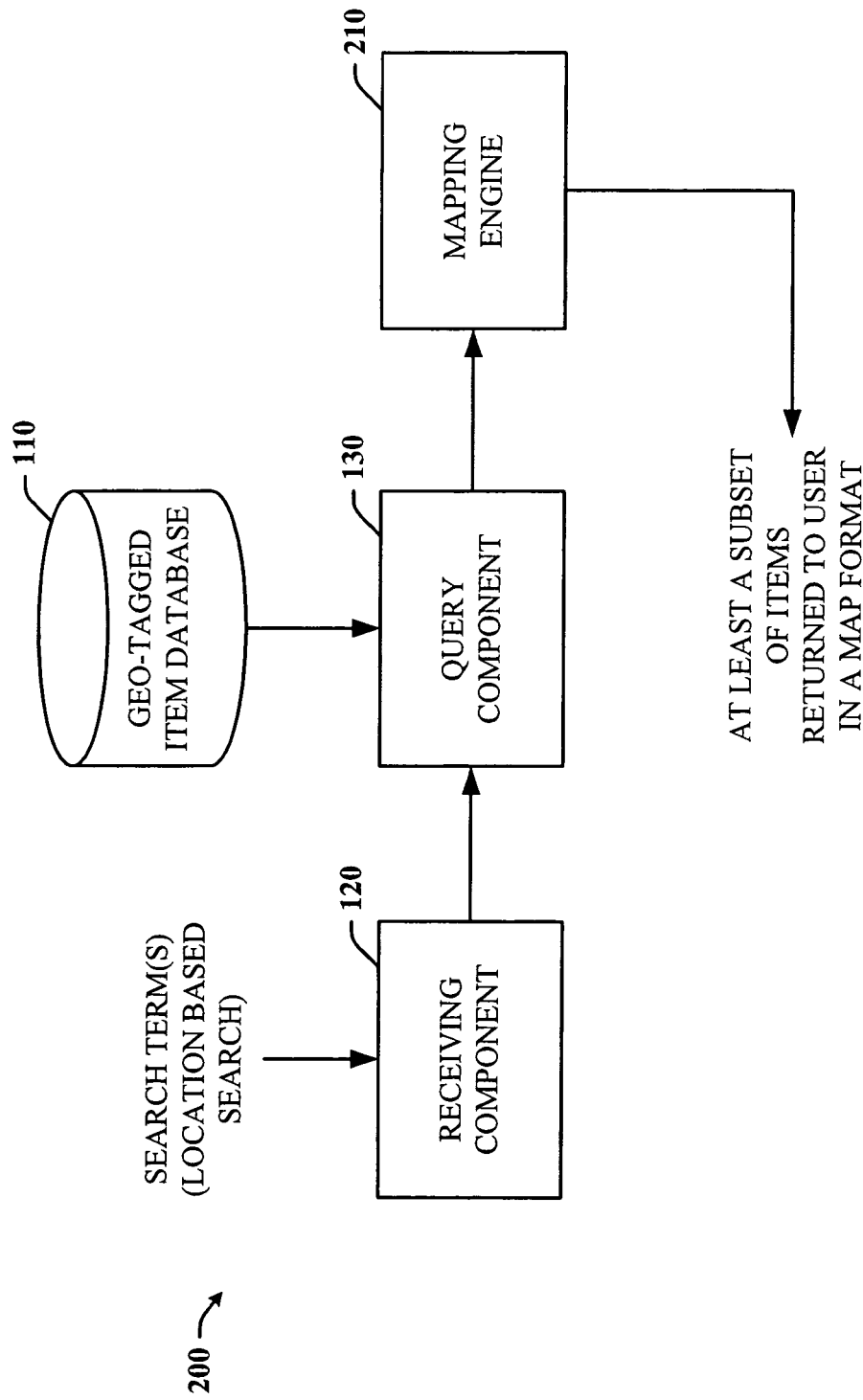
FIG. 2 is a block diagram of a location-based search system that facilitates looking for items for sale based at least in part on their location and displaying such search results in an interactive map format to enhance user viewing and navigation of the results.

Referring now to FIG. 2, there is shown a block diagram of a location-based search system 200 that makes use of the geo-tagged items retrieved by the system. In particular, the system 200 includes a mapping engine 210 that works with the query component 130. After the search terms are received and processed by the query component 130 and the appropriate items are retrieved from the geo-tagged item database 110, the mapping engine 210 can display the search results in a map format. The user can then view the search results according to the descriptions of each item as well as their locations with respect to each other or to the user's location or both. In addition to viewing the location of the items, the user may also be able to view the areas, streets, highways, neighborhoods, etc. surrounding such items. This can be particularly important and useful to the user when the item is a piece of real property such as a house, apartment, condominium, commercial space, or undeveloped land or in general, when an area surrounding the item may implicitly or explicitly affect the value of the item in the eyes of the user.

For example, a home buyer can search the classified listings based on desired city or suburb locations and view results using the mapping engine 210. From this vantage point, the home buyer can further narrow his/her search or eliminate certain items returned in the search results based on their proximities to high-crime neighborhoods, highways, high traffic streets, schools, job, daycare, etc. Highways and schools can be readily identified on the map; however, high-crime areas, busy streets and intersections, or chronically congested areas may not be as evident to a buyer looking to move into a new city. The mapping engine 210 can be programmed to identify such elements and display them to the buyer. For example, the buyer can use a pointing device to hover over a street, intersection, or area and be provided with census information, crime statistics, traffic accident statistics, etc.

In addition to allowing the user to view the search results in a map format, the mapping engine 210 can also generate directions between search results and/or between the search results and the user's location. For instance, if the user has retrieved a list of garage sales for the weekend, the mapping engine 210 can recommend one or more routes that the user can take to see all or a selected subset of garage sales retrieved by the user's search.

Though not pictured in the figure, the mapping engine can also generate suggested routes for the user when the user wishes to buy and pick up multiple items from multiple sellers. Suppose that an antique collector who just moved to Redmond from Dallas has purchased a chair located in Redmond and now wants to buy a coordinating lamp. Two different sellers offering the same lamp (e.g., same quality and condition) for the same price are located in Woodinville and Maple Valley. Since the antique collector is unfamiliar with the western Washington area, he can request the mapping engine 210 or some component thereof to generate directions and driving times to both locations—from either the buyer's location or the location of the chair or both. Thus, the mapping engine 210 can facilitate and enhance a user's shopping experience regardless of whether they looking for an item nearby or across the country. As a result, the systems 100, 200 facilitate creating a single local and/or nationwide marketplace that provides users with a local everywhere sense.

Figure 3:
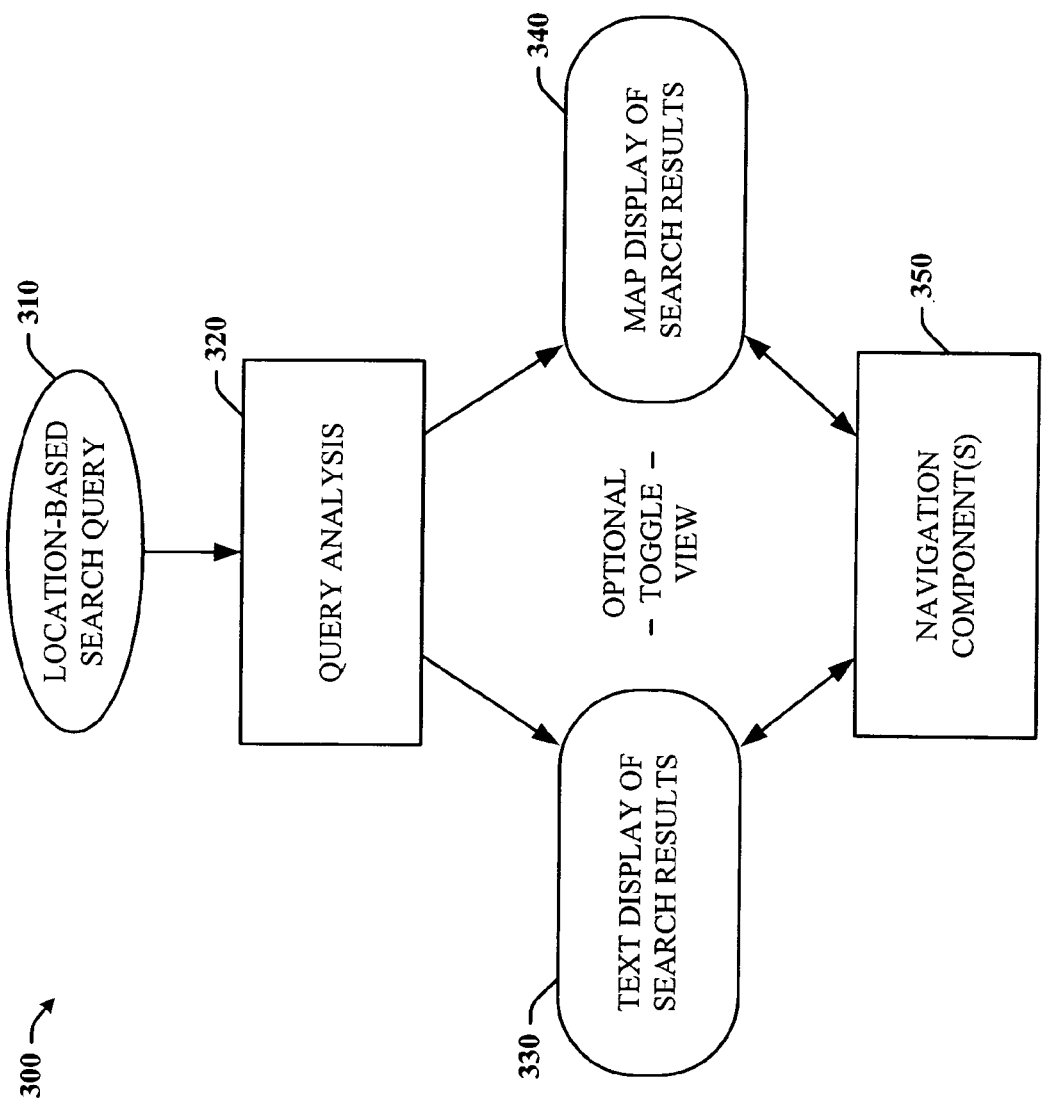
FIG. 3 is a block diagram of a location-based search system that facilitates displaying search results in a map and/or list view.
Figure 4:
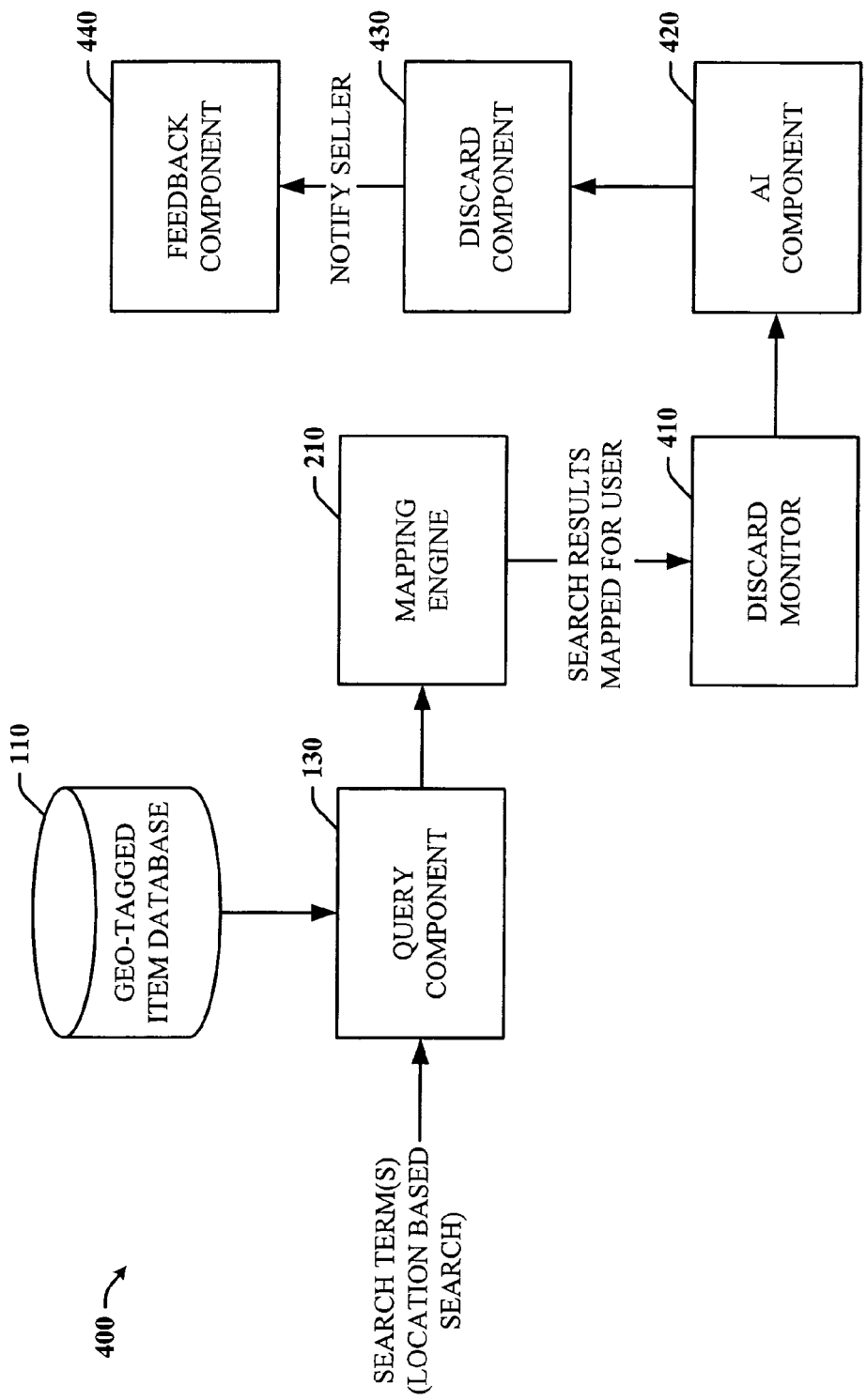
FIG. 4 is a block diagram of a location-based search system that incorporates a feedback feature to provide sellers with valuable information regarding their item listings.

Turning to FIG. 3, there is demonstrated a block diagram of a location-based search system 300 that facilitates a user's shopping experience in connection with an online classifieds service. In particular, the user can submit a location-based search query 310 for query analysis 320. The query 310 can be analyzed to determine whether any listed geo-tagged items (not shown) satisfy the conditions or terms of the query 310. Any such items that do satisfy the query 310 can be returned to the user in the form of a text listing 330 and/or a map display 340. The user may have the option to view both display types at the same time or toggle between them for optimal viewing of each.

Regardless of the display in view, the user can employ one or more navigation components 350 to look at each item in more detail. For example, the user can use a pointer to select (click) an item for maximized viewing. Alternatively, the user can use the pointer to hover over an item pinpointed on the map to see more information about the item. Selected items can be eliminated or removed by the user in either display such as to avoid confusion with any of the other items. Both displays can be dynamically updated and generated based on refined search queries or modifications to the most recent search query.

Search queries can be saved and the corresponding results can be recalled and displayed in text or map view according to the current availability of the item. In some instances, a seller may move his item to a different location from the last time the user viewed the item. If the seller changes or updates the location of the item while the user is viewing the item, then the map display can be automatically updated or refreshed in near real-time so that the user is provided with the most up-to-date information.

An item's geographic reference can be beneficial to both the buyer and the seller (or item owner). The previous discussion has focused on the many benefits the buyer is afforded by being privy to the item's location. Successful sellers may or may not be aware that their location has contributed to their success since there is no question that users are viewing and selecting their items for purchase. However, for some other sellers, reasons for their lack of success may not be evident to them. To provide indirect user feedback to the seller, the location-based search system 200 as described in FIG. 2, supra, can also include a discard monitor 410. The discard monitor 410 can collect information regarding which items were explicitly eliminated or removed from the search results by the user. An AI component 420 can learn to recognize the factors for discarding items for the particular user and then impart this knowledge onto a discard component 430. The discard component 430 can then automatically suggest items for discard or mark them for discard.

Sellers can be informed of their discarded items as well as the users (e.g., by username or email address) who discarded them. Knowing the other items which were displayed with the discarded item but not discarded themselves may be useful as well. Any or all of this information can be communicated to the relevant sellers via a feedback component 440. The affected sellers can analyze and compare their items with the non-discarded items in order to improve their performance. In addition, the sellers may contact the users to obtain more direct feedback from them as to why their items were discarded. For example, perhaps their images or description of the item are poor or inadequate compared to the other sellers' items; perhaps the item's location is less desirable when mapped than other comparable items being offered in nearby locations; or perhaps the item's location information requires greater specificity given the type of item being offered. Regardless of the reasons, sellers can benefit from learning this information implicitly from the users to improve or adjust their listings. Sellers may also be given the opportunity to informally communicate with the users to obtain more direct feedback.

Figure 5:
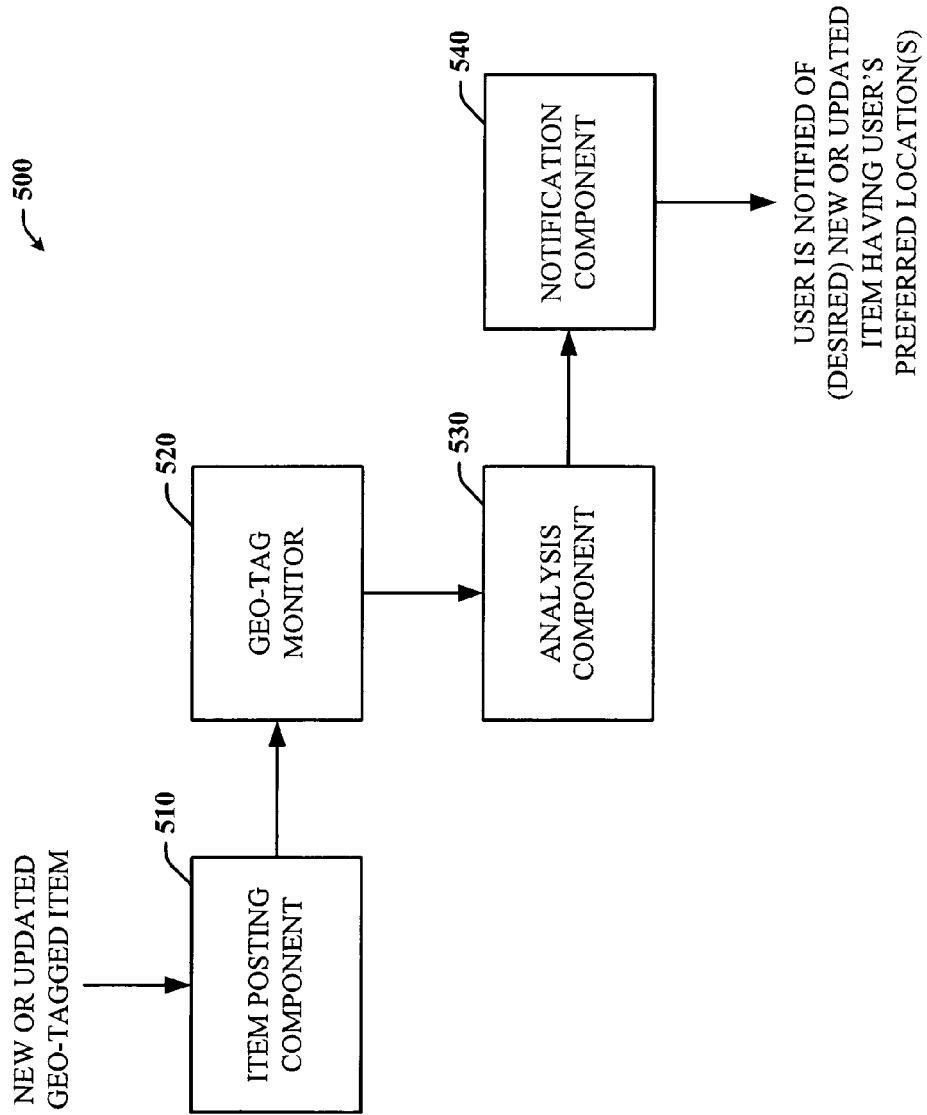
FIG. 5 is a block diagram of a location-based notification system that can be employed with the location-based search system to facilitate alerting a shopper that one or more geo-tagged items having a desirable or preferred location has recently been posted or updated.

Turning now to FIG. 5, there is a block diagram of a system 500 that can be employed in conjunction with any one of the location-based search systems described in FIGS. 1, 2, 3, and 4, supra, to facilitate user awareness of new or updated listings having preferred geo-tags. More specifically, the system 500 includes an item posting component 510 that receives and posts new or updated items which have been geo-tagged. Geo-tagged items stored in the system's database (not shown) can be monitored according to the items' geo-tags by a geo-tag monitor 520. A user can designate his/her preferred geo-tags by city, state, zip code, region, etc. In addition, the user can indicate a particularly higher level of interest in certain kinds of items and identify those items. The geo-tag monitor 520 can check for any matches between the geo-tagged items and the user's preferences based on location alone (e.g., Davis, Calif.) or in combination with a specific type of item (e.g., paintings) or seller. Possible matches are determined and/or confirmed by an analysis component 530 and then communicated to a notification component 540 that alerts the user to any matches. Notification can be in the form of an email or instant message, or by the presence of an icon or symbol on the user's user interface. Moreover, the location-based notification system 500 can save the user much time in finding items of interest based at least in part on the item's location.

Moving on to FIGS. 6-11, there are illustrated screenshots of exemplary user interfaces that can be employed to facilitate the systems and methods described herein. It should be appreciated that while certain ways of displaying information to users are shown and described with respect to certain figures, those skilled in the relevant art will recognize that various other alternatives can be employed. The content shown on the screens can be stored and/or transmitted as display descriptions, graphical user interfaces, or by other methods of depicting information on a screen (whether personal computer, PDA, mobile phone, or other suitable device, for example) where the layout and information or content to be displayed may be stored in memory, database(s), or other storage facility.

Figure 6:
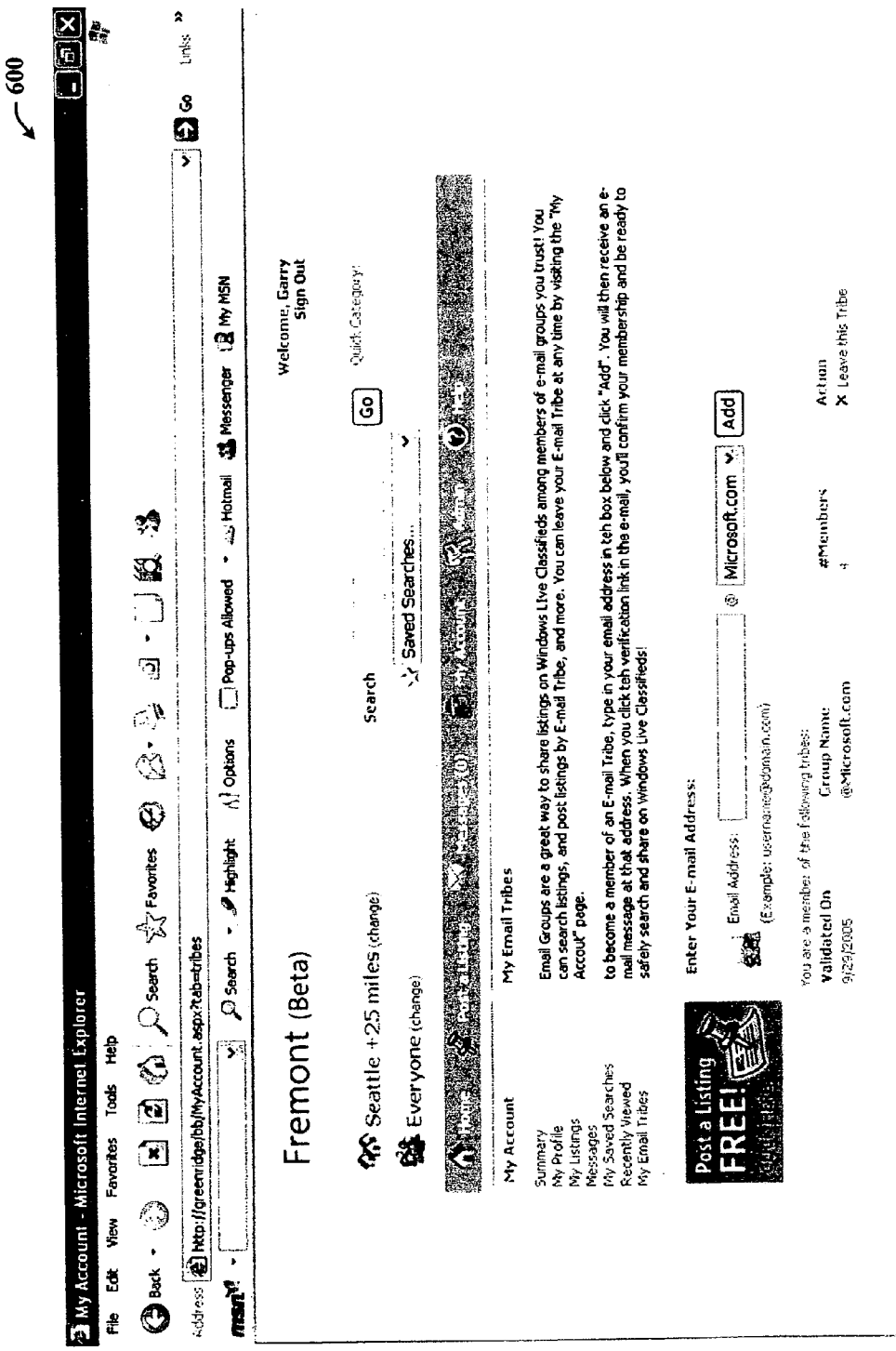
FIG. 6 is a screenshot of an exemplary user interface for a user account within an online classifieds service wherein users can shop or look for items based at least in part on the items' geographic reference.

The online classifieds service described hereinabove may require its users to create an account in order to use the service. The screenshot represented in FIG. 6 is an exemplary view of a user interface 600 for the user's account. In this view, the user can manage his/her profile, listings, email tribes, and group memberships which are part of the user's account as well as perform searches for items and retrieve saved searches or recently viewed items. The user may also import and/or manage inventory, post new items, and/or retrieve historical data relating to previous purchases or sales. Furthermore, messages from other users of the service can be accessed and otherwise managed from this view. The messages may include both email as well as instant communications and may be in the format of text or voice.

Figure 7:
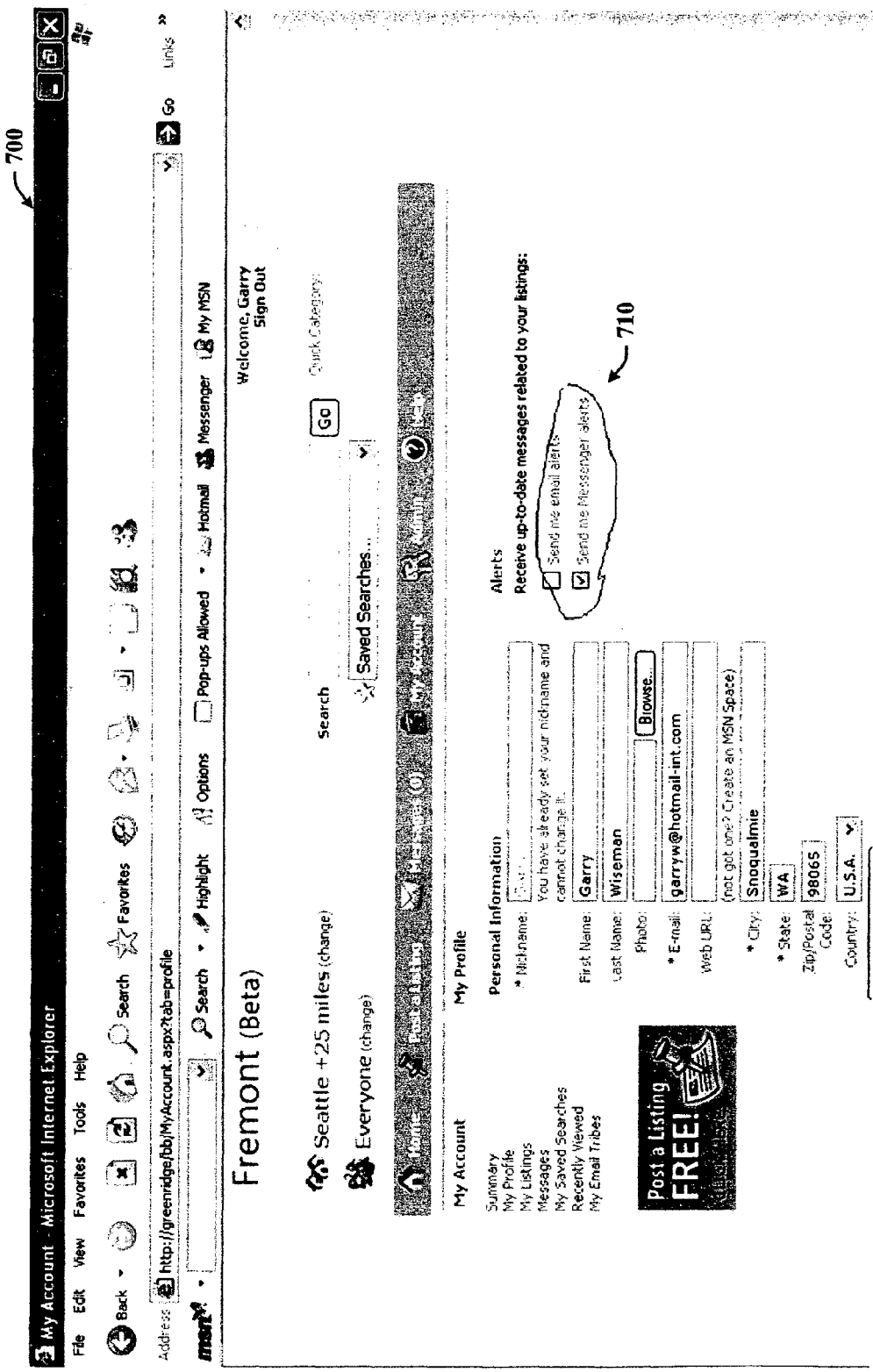
FIG. 7 is a screenshot of an exemplary user interface of a user profile screen within an online classifieds service wherein users can select to receive alerts relating to their contacts' listings.

In FIG. 7, the exemplary user interface 700 demonstrates the user's profile and at least one type of preference that can be set: alerts 710. The format of the alerts can be selected by the user (as shown) as well as the criteria for receiving such alerts (not shown). For example, the user can request alerts to be sent based at least in part upon an item's or seller's location (geo-tag). A user from Texas may wish to support other users living in Texas. Alternatively, a Seattle user may only be interested in items located in the Seattle area. The types of items that the user is more interested in can also be specified by the user.

The user's profile requires a minimal amount of information such as a nickname for the user (to protect the user's real identity from the general public), an email address which serves as perhaps the only means of contact with the user, and the user's city and state or zip code. An optional photo of the user can be added for display next to the user's nickname. Though not shown in the figure, other fields relating to more personal information about the user can be made available such as the user's marital status, smoker or non-smoker, age range, occupation or profession, employment status, etc. At least a portion of the user profile information can remain hidden from general viewing through a default setting. This is done to protect the user's more sensitive information from being disclosed randomly or for no legitimate purpose to other users of the system or service.

Figure 8:
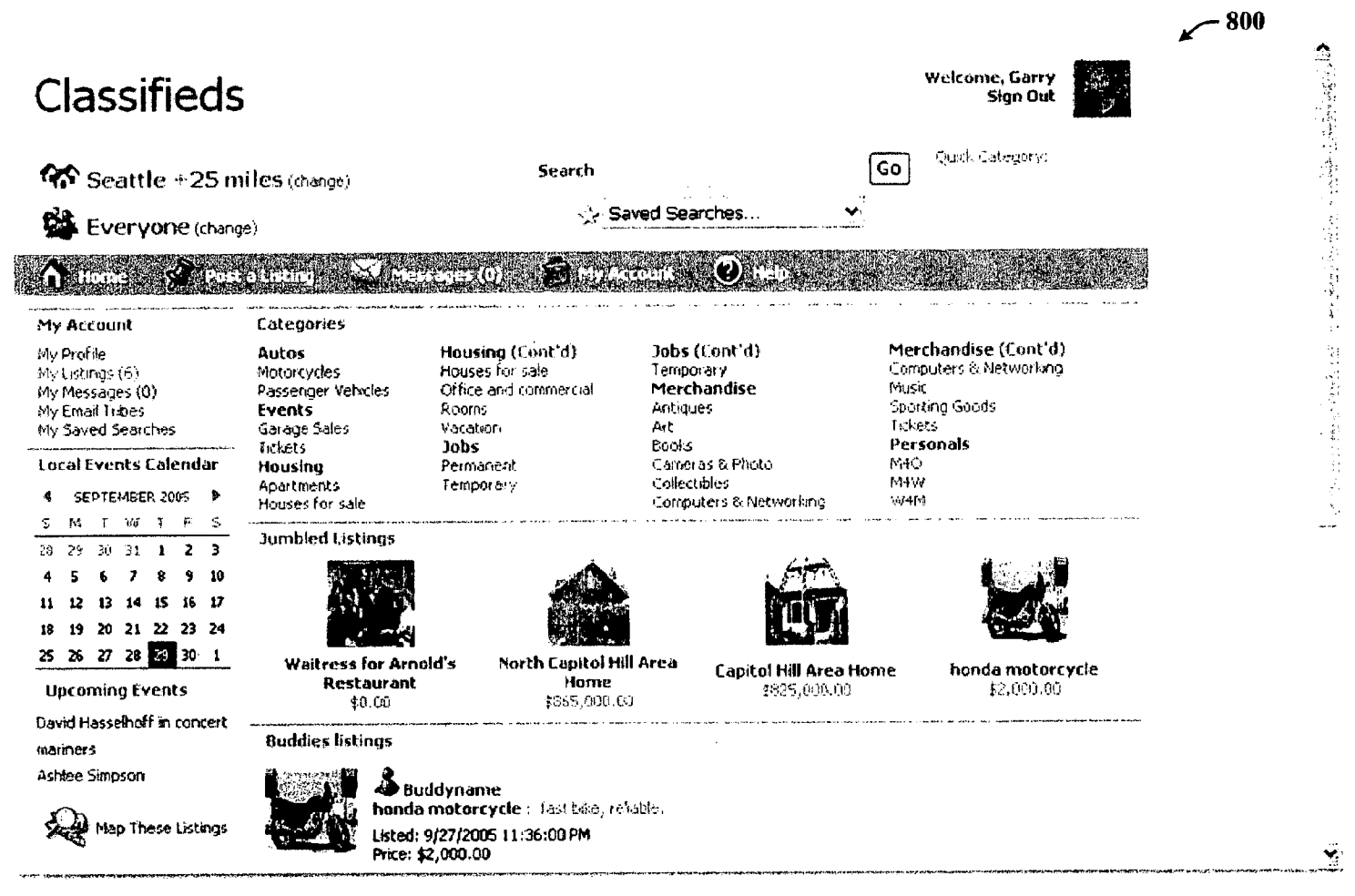

FIG. 8 depicts an exemplary user interface 800 of a user's homepage within the online classified listing service. The precise layout of the homepage can be customized by the user. Thus, this is but one arrangement of the various sections. From this view, the user can manage or access his user account, post a listing, conduct and save searches, retrieve previous searches and view current or recent search results. The search results can be grouped or organized by asking price, location, alphabetically, in order of popularity or user ranking, and/or by seller. A plurality of quick categories is also indicated in the user interface. Such categories can be utilized to facilitate faster searching, particularly when the category can be determined before any searching is performed. An events calendar can also be included on the homepage 800 which may or may not be linked to the user's external calendar (e.g., external to the classifieds service).

It should be appreciated that any of the user's listings—either posted by the user or otherwise selected by the user—can be readily mapped. Furthermore, any listings pending with the user can be mapped as well—alone or in combination with purchased listings or any other listings owned by the user. Thus, the mapping functionality is a very powerful and time-saving feature of this online classifieds service and can be employed in a variety of ways to optimize the user's experience.

Figure 9:
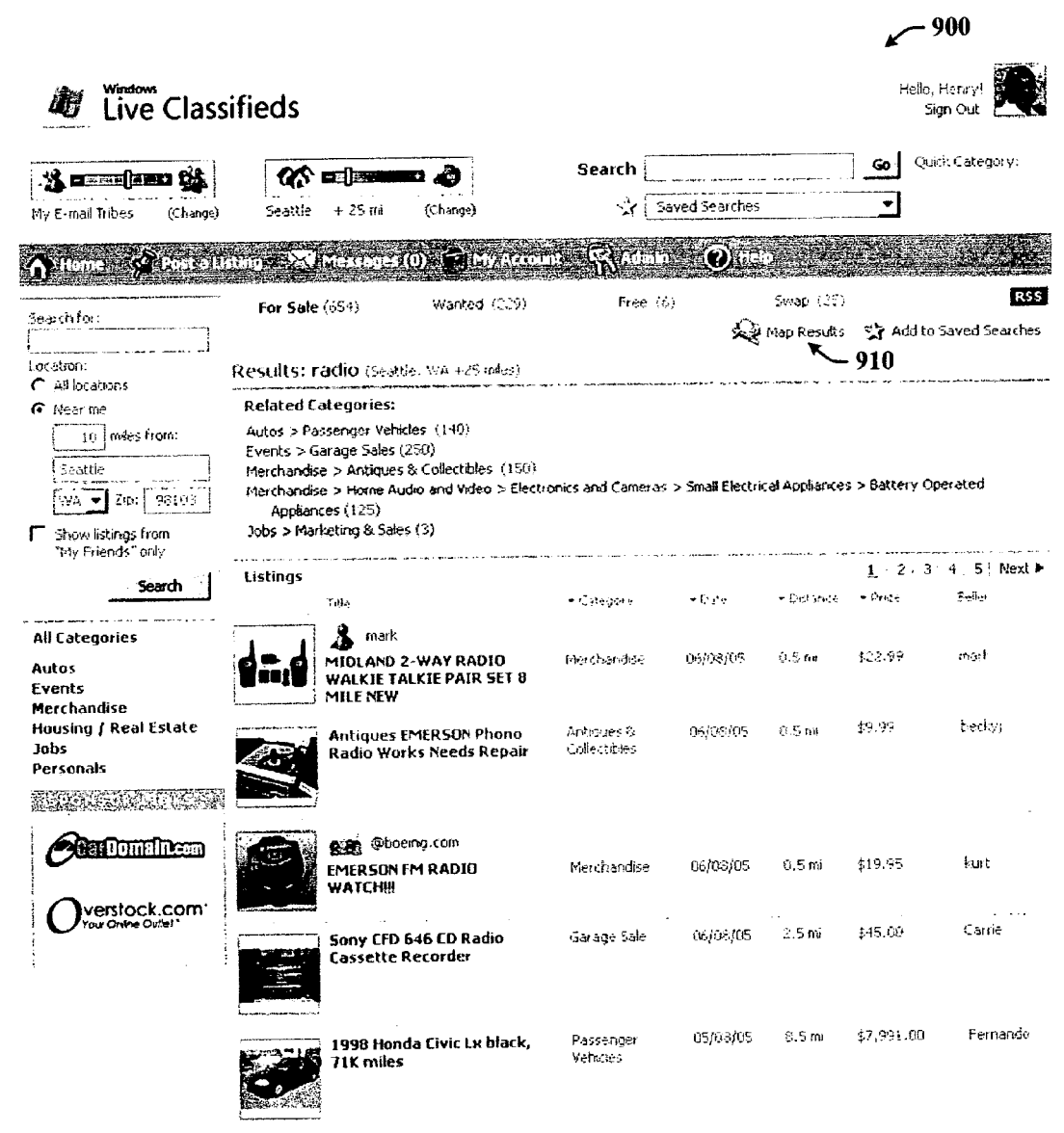

In practice, imagine that a shopper has entered the following search: radio located within 25 miles of Seattle, Wash. An exemplary set of search results for this search are depicted in the user interface 900 in FIG. 9. The results can be grouped wherein each group may have its own tab according to which items are for sale, wanted by other users, are offered for free, or are available for swap. As illustrated in FIG. 9, there are apparently 654 items that satisfy the search terms for sale, 229 such items are wanted, 6 items are being offered for free, and 25 items are available for swap. To view the listings of each group, the user can select the appropriate tab.

In addition to the groups of listings, the service can provide categories related to the user's search. Each category provided indicates one or more sub-categories under which the item is listed and the number of listings that are present therein. The category and sub-category provide the user with some context such as the type of radio that is listed—car radio, radios at garage sales, antique and collectible radios, battery operated radios, and even job positions relating to radio marketing and sales.

Each listing can include a picture of the item as well as a description written by the seller, the seller's name or username, the price, and the approximate location of the item in terms of the distance of the item from the user's location (e.g., 0.5 miles, 2.5 miles, etc.). Searches can be saved for later recall by the user. When recalled, the search results returned for that search can be retrieved as well; however, the listings can be updated to notify the user if a listed item is no longer available from the seller (e.g., canceled or already sold by the seller or item moved locations and no longer satisfies the user's search parameters). Other modifications to the listing such as price or location changes (not affected by search parameters) can undergo some kind of visualization, such as a color or font change or appendage of an icon or symbol, for example, that the user can readily recognize.

Figure 10:
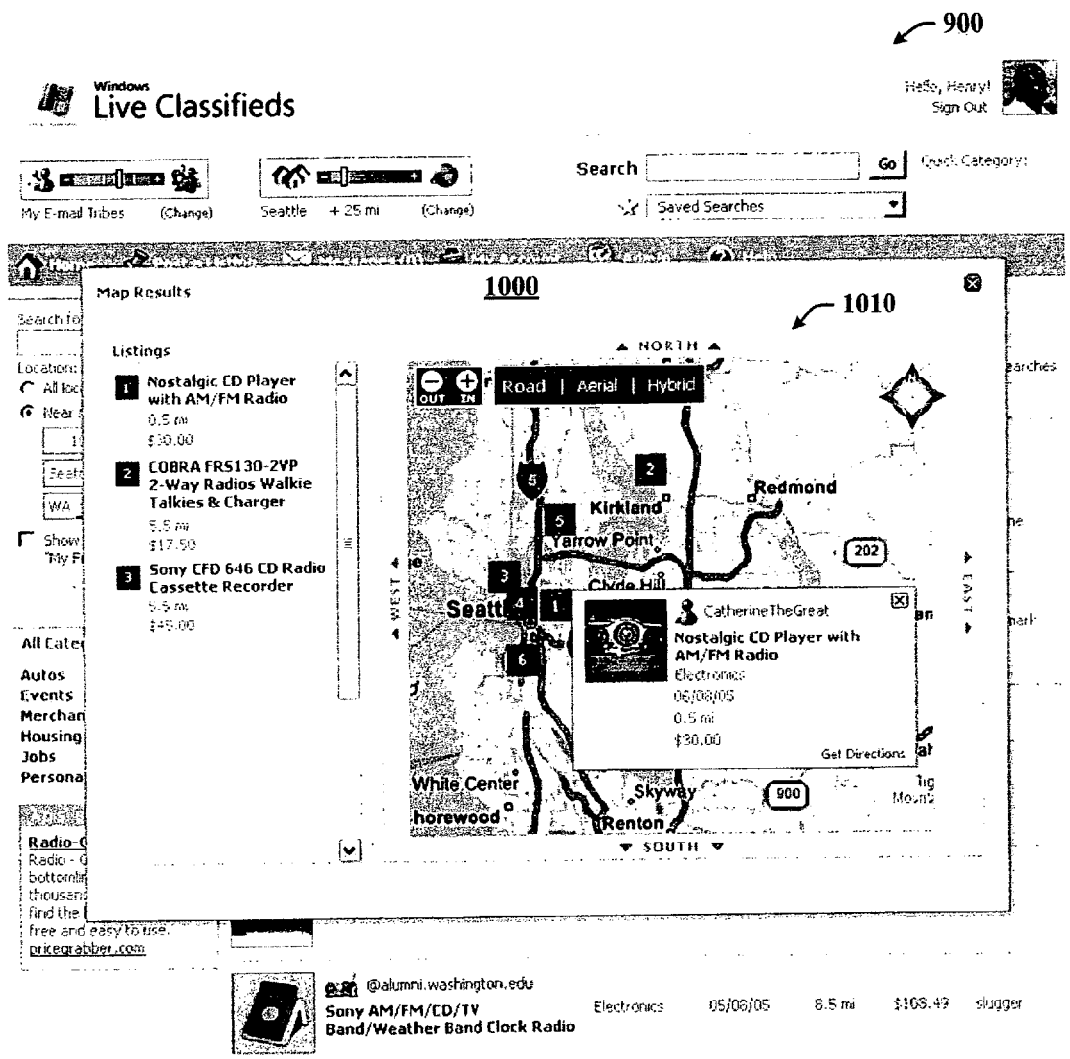
FIG. 10 is a screenshot of an exemplary user interface of search results provided by an online classifieds service in the form of a navigable map wherein the results returned to the user are based at least in part upon the geographic references of the items for sale.
Figure 11:
FIG. 11 is a screenshot of an exemplary user interface that depicts a detailed view of a posted item which has been selected by a user from a list of search results provided by an online classifieds service wherein the results returned to the user are based at least in part upon the geographic references of the posted items.

Since the location of the listed item can be important to a potential buyer, the listings can be viewed on a virtual map to visually comprehend where the items are located with respect to each other and/or with respect to the buyer. A control button 910 can be selected or clicked to open or toggle to the map view. The user interface 1000 displayed in FIG. 10 represents one such view of a dynamically generated virtual map.

The map 1010 can have a plurality of zoom levels to provide different perspectives and various amounts of geographic detail to the buyer. For example, in a road view, each listing can be pinpointed and labeled such as with a number with some level of road detail shown. The level of road detail can depend on the zoom level. The buyer can hover a pointer or other navigation component over the number to view a pop-up box which includes the listing content for the item. Aerial or hybrid views (combined road and aerial) may also be available. A list of the listed items in abbreviated form can also be present near or adjacent to the virtual map to provide the user with a quick reference of each item on the map. The virtual map can also be interactive, meaning that the user can click on just about any area to see more information about that area such population information, school district performance, restaurants, etc.

The user may select one or more listed items at a time to view the content in detail. In the user interface 1100 of FIG. 11, the user is viewing a listing for a 1999 Ford Windstar located in Colchester, Ill. Notice that the seller has only disclosed his city and state information. This may be because this item is a car and thus more vulnerable to theft if its address were made available to any or every user. When appropriate, the seller can individually inform interested buyers of the car's address. Some information about the seller (Garry) can also be displayed in the listing. Additional profile information may be revealed to a potential buyer based on the level of familiarity the seller has with the buyer and/or at the discretion of the seller. Because this online classifieds service can leverage off and/or incorporate various social communication networks supported by widely used messaging services, the user can make use of one or more of these messaging services to quickly and securely communicate with the seller.

Various methodologies will now be described via a series of acts. It is to be understood and appreciated that the subject system and/or methodology is not limited by the order of acts, as some acts may, in accordance with the subject application, occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the subject application.

Figure 12:
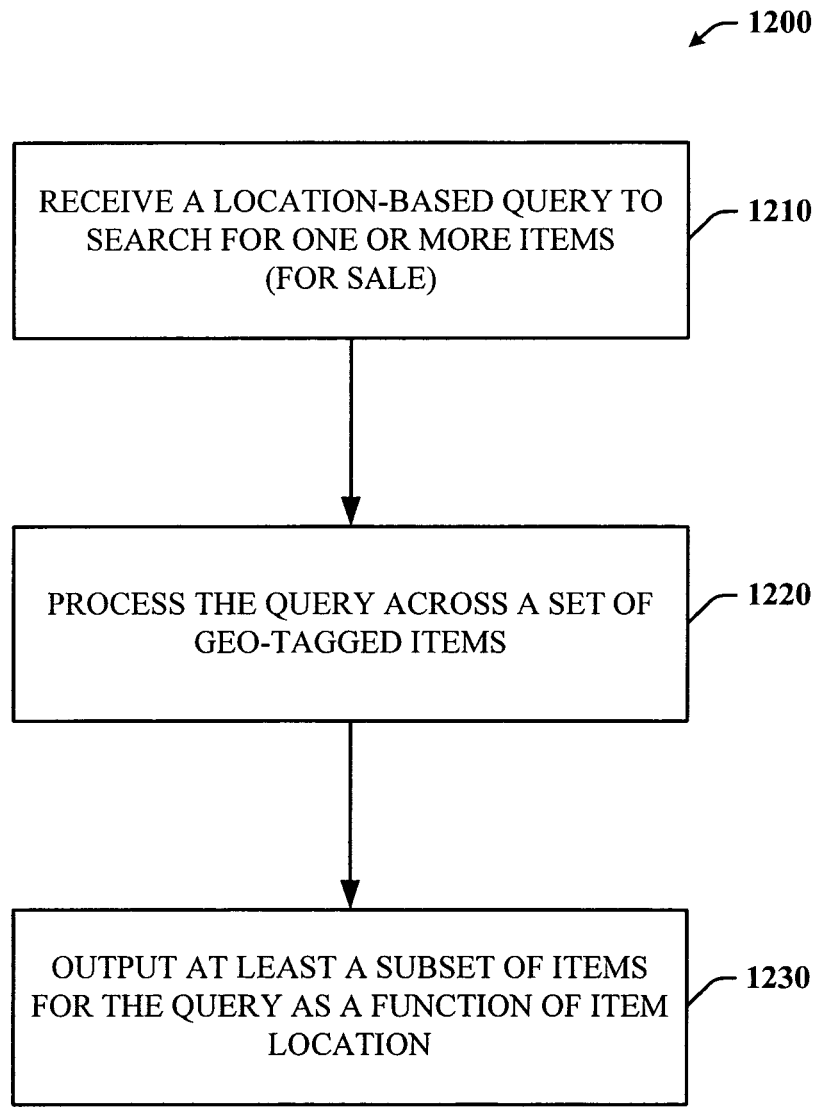
FIG. 12 is a flow chart illustrating an exemplary methodology that facilitates searching for one or more items for sale based at least in part on the item's location on an online classifieds site.

Turning now to FIG. 12, there is a flow diagram of an exemplary computer-implemented method 1200 that facilitates enhancing a user's searching and shopping experience within an online classifieds service. The method 1200 involves receiving a location-based query to search for one or more items at 1210. The items may be offered for sale, rent, lease, exchange or barter, or for free and can include any good, service, or event that abides by the service's rules, regulations and terms of use. At 1220, the query can be processed across a set of geo-tagged items which have been posted by one or more sellers. Data relating to these items can be stored and maintained in at least one database. At 1230, at least a subset of the items can be provided as output and given to the requesting user (shopper), wherein the subset of items are selected as a function of the item's location.

Figure 13:
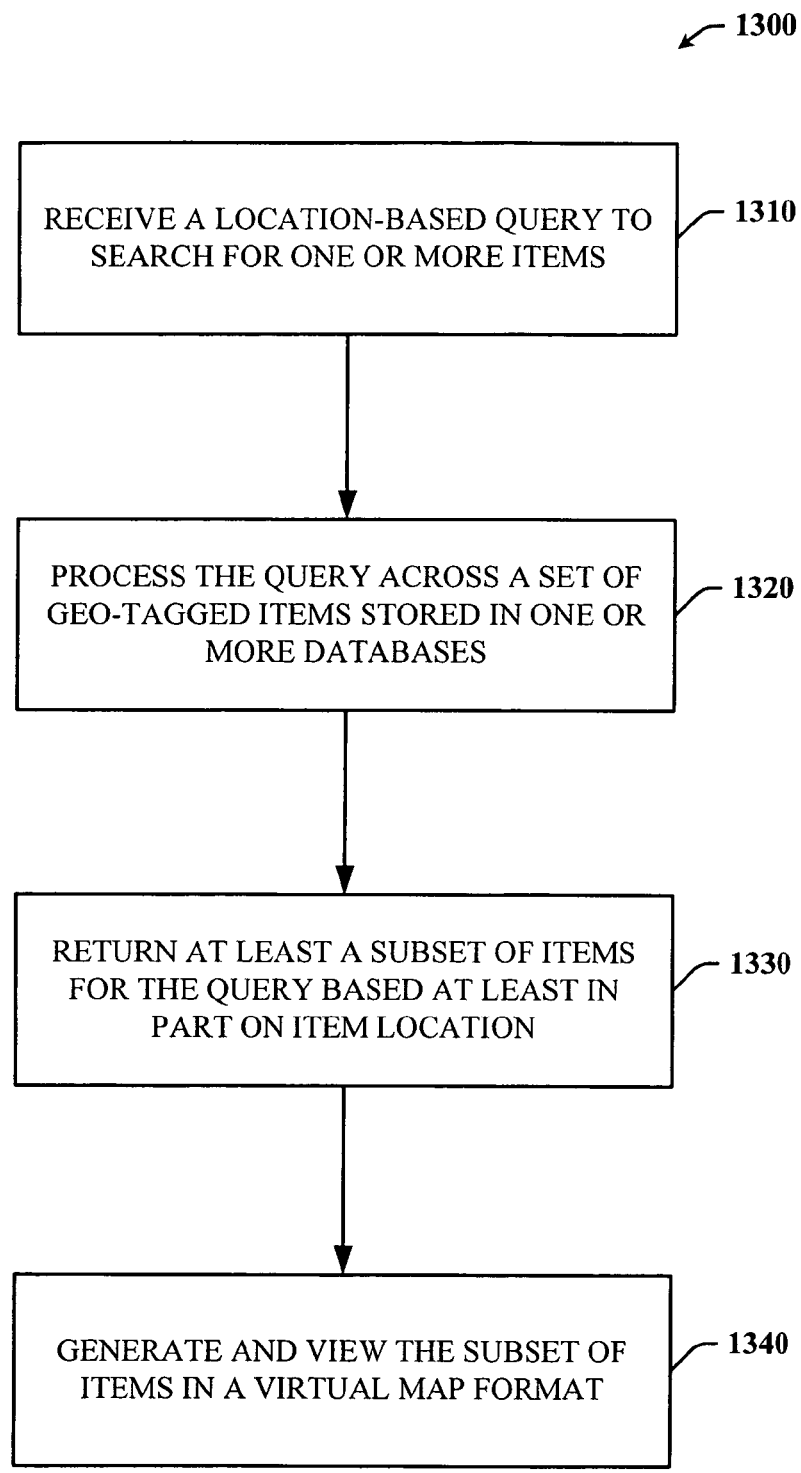
FIG. 13 is a flow chart illustrating an exemplary methodology that facilitates displaying search results according to the items' locations in a map format when making use of an online classifieds site or service.

Referring now to FIG. 13, there is a flow diagram of an exemplary method 1300 that facilitates viewing search results obtained while perusing through an online classifieds site. The method 1300 involves receiving a location-based query to search for one or more items at 1310. At 1320, the query can be processed in part by analyzing stored geo-tagged items. At least a subset of items that satisfy the query can be returned to the user at 1330. The subset of items can be provided to the user as a text and image list and/or as a virtual map at 1340 whereby the items are pinpointed or marked on the map according to their respective locations.

By viewing the relevant items on a virtual map, the user can comprehend approximate distances between the items and/or between himself/herself and the item. The map functionality also allows the user to obtain driving directions as well as view the areas and other physical structures, roads, highways, etc. surrounding the items. For example, suppose the item is a job posting. The interested user can map the drive from his/her house or a child's daycare to the job's location to determine potential commute times, travel routes, and transportation costs (e.g., bus or train fare, gas allowance, car mileage, etc.). Similarly, the user can employ the map functionality to generate the most efficient and safest route between multiple job locations when the interviewing process begins.

Figure 14:
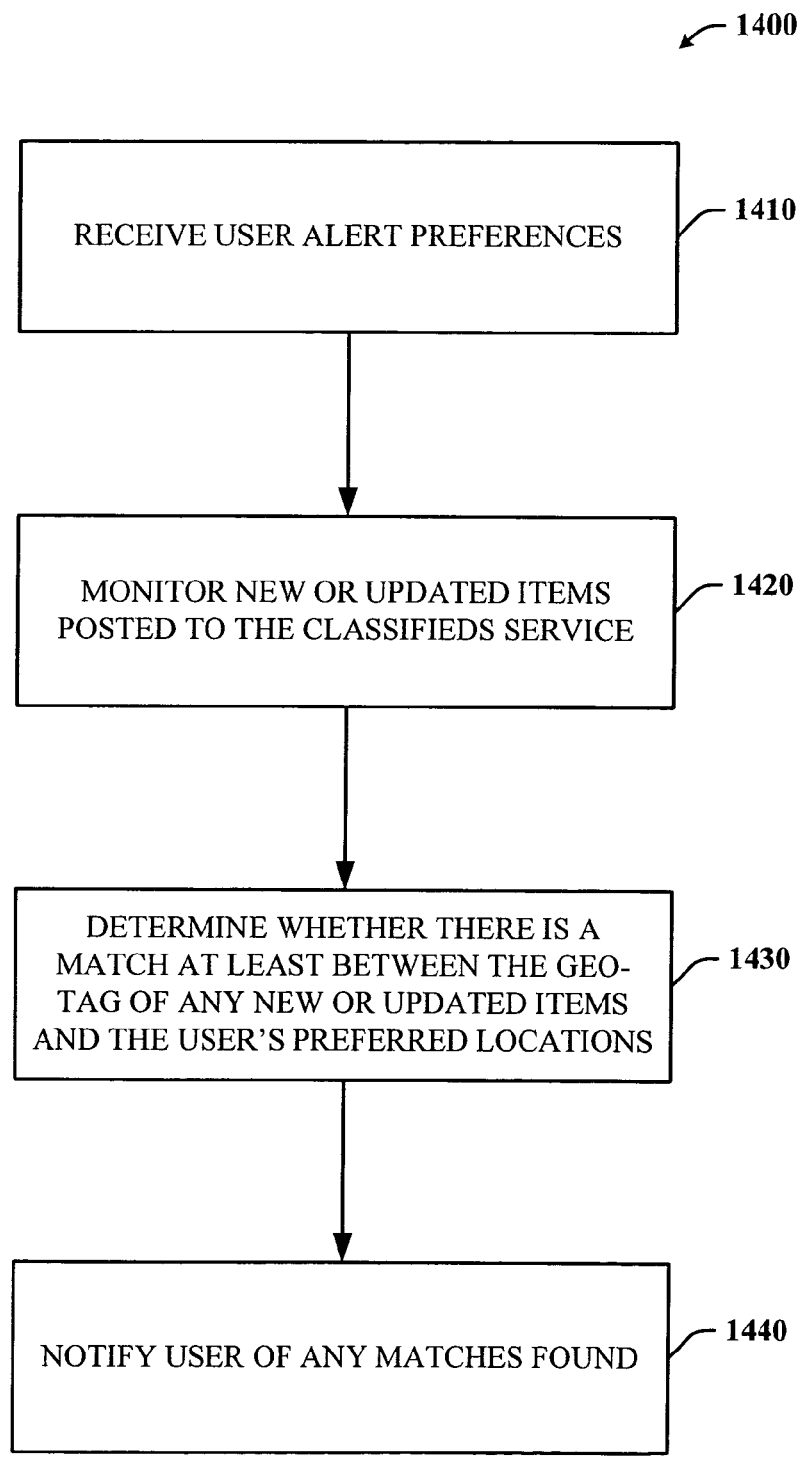
FIG. 14 is a flow chart illustrating an exemplary methodology that facilitates notifying a user or potential buyer when new or updated items are posted to the online classifieds site, whereby such items are flagged for notification based at least in part on their locations (or geo-tags).

Moving on to FIG. 14, there is a flow diagram of an exemplary method 1400 that facilitates notifying a user or potential buyer when new or updated items are posted to the online classifieds site. The method involves receiving user alert preferences at 1410. Along with any other criteria, the user can indicate his/her preferred item locations such as midtown Manhattan or La Jolla, Calif. At 1420, new or updated items posted to the classifieds site can be monitored. Following, the method 1400 can determine whether there is a match between the geo-tag of any new or updated item and at least the user's geo-tag preferences at 1430. When a match is found or determined, the user can be notified of the relevant items at 1440.

Figure 15:
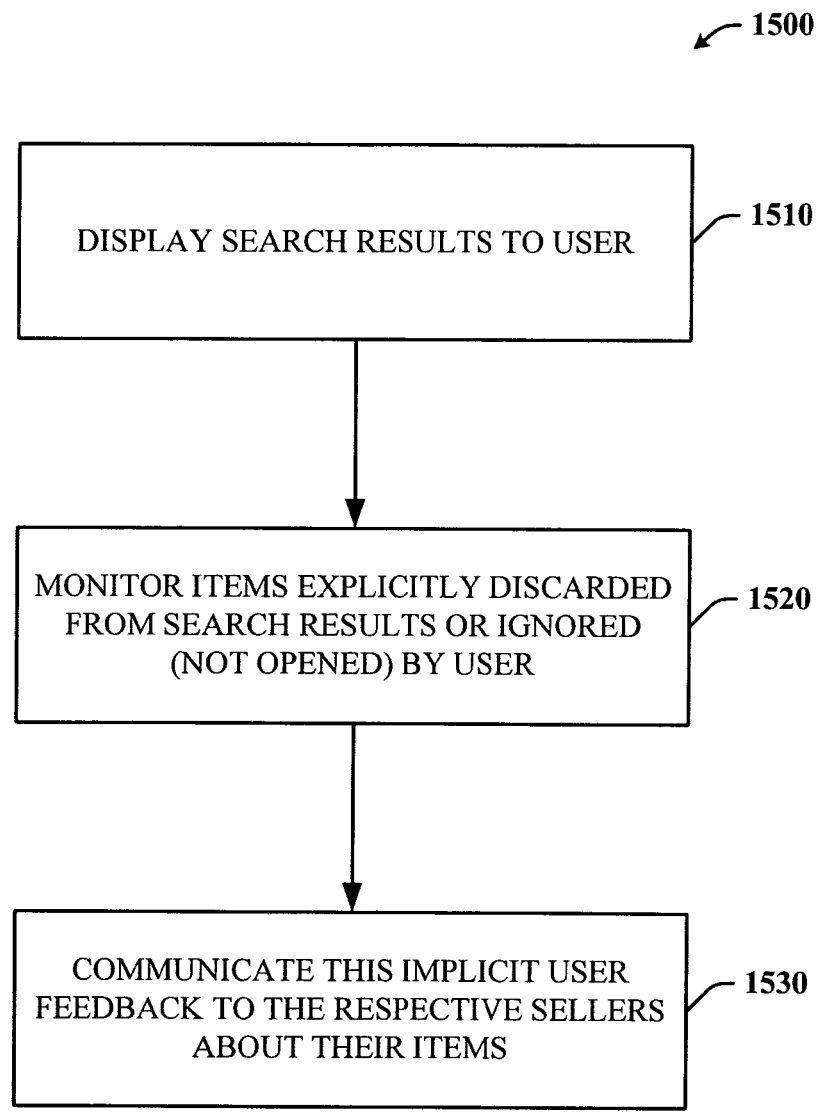
FIG. 15 is a flow chart illustrating an exemplary methodology that facilitates providing implicit user feedback to item owners or sellers regarding their respective items.

In FIG. 15, an exemplary method 1500 is illustrated that facilitates providing implicit user feedback to item owners or sellers regarding their respective items. The method 1500 involves displaying search results to the user at 1510. The results can be displayed in the form of a list or a virtual and interactive map. At any time while interfacing with the search results, the user may simply ignore some items, such as by not opening them for additional viewing, or may explicitly remove them from the search results list or map. Sellers who may be experiencing difficulty in moving their items may be unaware or even clueless as to why their items are not attracting buyers. In such cases, the items which have been ignored or explicitly discarded by the user can be monitored at 1520 and the owners or sellers of such affected items can receive user feedback in this implicit manner. For example, a seller can be informed that his/her item was expressly removed from the user's search results page. The seller can also be provided with the user's username or email address. To learn more about the user's opinions, the seller can contact the user. Alternatively, the user's username and/or email address can be hidden from the seller but the seller can send a message to the user (through the classifieds service) to request additional feedback from the user.

Figure 16:
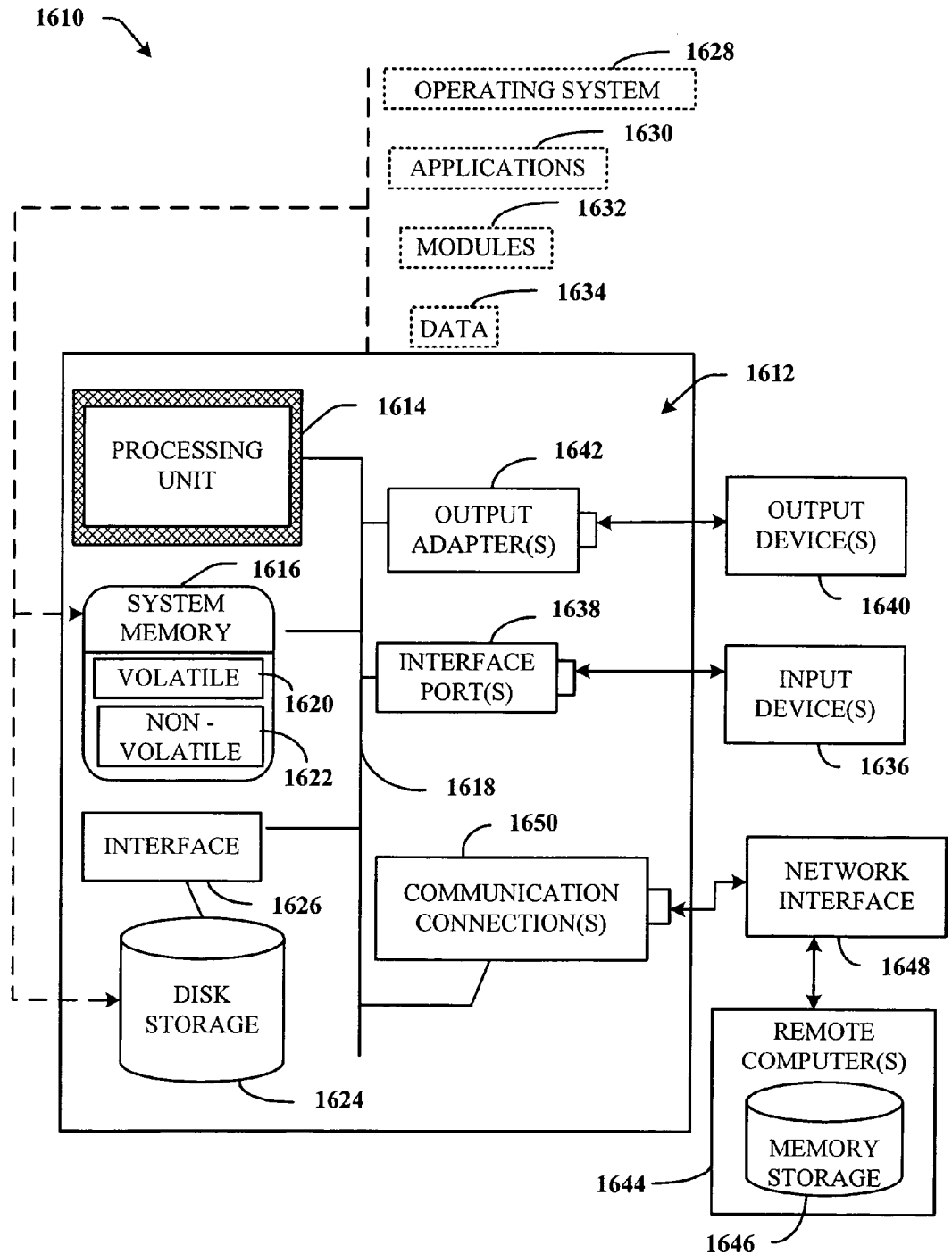
FIG. 16 illustrates an exemplary environment for implementing various aspects of the invention.

In order to provide additional context for various aspects of the subject application, FIG. 16 and the following discussion are intended to provide a brief, general description of a suitable operating environment 1610 in which various aspects of the subject application may be implemented. While the system(s) and/or method(s) is described in the general context of computer-executable instructions, such as program modules, executed by one or more computers or other devices, those skilled in the art will recognize that the invention can also be implemented in combination with other program modules and/or as a combination of hardware and software.

Generally, however, program modules include routines, programs, objects, components, data structures, etc. that perform particular tasks or implement particular data types. The operating environment 1610 is only one example of a suitable operating environment and is not intended to suggest any limitation as to the scope of use or functionality of the system and/or method. Other well known computer systems, environments, and/or configurations that may be suitable for use with the system and/or method include but are not limited to, personal computers, hand-held or laptop devices, multiprocessor systems, microprocessor-based systems, programmable consumer electronics, network PCs, minicomputers, mainframe computers, distributed computing environments that include the above systems or devices, and the like.

With reference to FIG. 16, an exemplary environment 1610 for implementing various aspects of the system and/or method includes a computer 1612. The computer 1612 includes a processing unit 1614, a system memory 1616, and a system bus 1618. The system bus 1618 couples system components including, but not limited to, the system memory 1616 to the processing unit 1614. The processing unit 1614 can be any of various available processors. Dual microprocessors and other multiprocessor architectures also can be employed as the processing unit 1614.

The system bus 1618 can be any of several types of bus structure(s) including the memory bus or memory controller, a peripheral bus or external bus, and/or a local bus using any variety of available bus architectures including, but not limited to, 11-bit bus, Industrial Standard Architecture (ISA), Micro-Channel Architecture (MCA), Extended ISA (EISA), Intelligent Drive Electronics (IDE), VESA Local Bus (VLB), Peripheral Component Interconnect (PCI), Universal Serial Bus (USB), Advanced Graphics Port (AGP), Personal Computer Memory Card International Association bus (PCM-CIA), and Small Computer Systems Interface (SCSI).

The system memory 1616 includes volatile memory 1620 and nonvolatile memory 1622. The basic input/output system (BIOS), containing the basic routines to transfer information between elements within the computer 1612, such as during start-up, is stored in nonvolatile memory 1622. By way of illustration, and not limitation, nonvolatile memory 1622 can include read only memory (ROM), programmable ROM (PROM), electrically programmable ROM (EPROM), electrically erasable ROM (EEPROM), or flash memory. Volatile memory 1620 includes random access memory (RANI), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM).

Computer 1612 also includes removable/nonremovable, volatile/nonvolatile computer storage media. FIG. 16 illustrates, for example a disk storage 1624. Disk storage 1624 includes, but is not limited to, devices like a magnetic disk drive, floppy disk drive, tape drive, Jaz drive, Zip drive, LS-100 drive, flash memory card, or memory stick. In addition, disk storage 1624 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 1624 to the system bus 1618, a removable or non-removable interface is typically used such as interface 1626.

It is to be appreciated that FIG. 16 describes software that acts as an intermediary between users and the basic computer resources described in suitable operating environment 1610. Such software includes an operating system 1628. Operating system 1628, which can be stored on disk storage 1624, acts to control and allocate resources of the computer system 1612. System applications 1630 take advantage of the management of resources by operating system 1628 through program modules 1632 and program data 1634 stored either in system memory 1616 or on disk storage 1624. It is to be appreciated that the subject system and/or method can be implemented with various operating systems or combinations of operating systems.

A user enters commands or information into the computer 1612 through input device(s) 1636. Input devices 1636 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 1614 through the system bus 1618 via interface port(s) 1638. Interface port(s) 1638 include, for example, a serial port, a parallel port, a game port, and a universal serial bus (USB). Output device(s) 1640 use some of the same type of ports as input device(s) 1636. Thus, for example, a USB port may be used to provide input to computer 1612 and to output information from computer 1612 to an output device 1640. Output adapter 1642 is provided to illustrate that there are some output devices 1640 like monitors, speakers, and printers among other output devices 1640 that require special adapters. The output adapters 1642 include, by way of illustration and not limitation, video and sound cards that provide a means of connection between the output device 1640 and the system bus 1618. It should be noted that other devices and/or systems of devices provide both input and output capabilities such as remote computer(s) 1644.

Computer 1612 can operate in a networked environment using logical connections to one or more remote computers, such as remote computer(s) 1644. The remote computer(s) 1644 can be a personal computer, a server, a router, a network PC, a workstation, a microprocessor based appliance, a peer device or other common network node and the like, and typically includes many or all of the elements described relative to computer 1612. For purposes of brevity, only a memory storage device 1646 is illustrated with remote computer(s) 1644. Remote computer(s) 1644 is logically connected to computer 1612 through a network interface 1648 and then physically connected via communication connection 1650. Network interface 1648 encompasses communication networks such as local-area networks (LAN) and wide-area networks (WAN). LAN technologies include Fiber Distributed Data Interface (FDDI), Copper Distributed Data Interface (CDDI), Ethernet/IEEE 1102.3, Token Ring/IEEE 1102.5 and the like. WAN technologies include, but are not limited to, point-to-point links, circuit switching networks like Integrated Services Digital Networks (ISDN) and variations thereon, packet switching networks, and Digital Subscriber Lines (DSL).

Communication connection(s) 1650 refers to the hardware/software employed to connect the network interface 1648 to the bus 1618. While communication connection 1650 is shown for illustrative clarity inside computer 1612, it can also be external to computer 1612. The hardware/software necessary for connection to the network interface 1648 includes, for exemplary purposes only, internal and external technologies such as, modems including regular telephone grade modems, cable modems and DSL modems, ISDN adapters, and Ethernet cards.

What has been described above includes examples of the subject system and/or method. It is, of course, not possible to describe every conceivable combination of components or methodologies for purposes of describing the subject system and/or method, but one of ordinary skill in the art may recognize that many further combinations and permutations of the subject system and/or method are possible. Accordingly, the subject system and/or method are intended to embrace all such alterations, modifications, and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A system that facilitates improved efficiency when searching for items for sale on an online classifieds site comprising;
    a processing unit for executing computer-executable instructions; and
    memory, in communication with the processing unit, containing computer-executable instructions for a system comprising:
    a query component that processes a query that is related to a search for an item posted on the classifieds site across a set of geo-tagged items and returns at least a subset of items in response to the query as a function of item location for a user to view;

a discard monitor that examines user historical behavior and activity with respect to at least one of previous searches, purchases, selected items, and expressly discarded items for the user;

a discard component that marks one or more items that are suitable for discard based at least in part on data collected by the discard monitor, and a feedback component that provides implicit user feedback by collecting data relating to discarded items and communicating at least a portion of the collected data to one or more owners of such items.

2. The system of claim 1, wherein the data comprises the discarded item and at least one of the following: username or email address of the user that discarded the item and a rate at which the item was explicitly discarded by users.

3. The system of claim 1 further comprises an AI component that learns one or more factors for discarding items for a particular user in party by comparing characteristics of the discarded items with those of any non-discarded items.

4. The system of claim 1, wherein the feedback component further comprises a messaging component that allows an owner to communicate with a user that discarded the item without revealing the username or email address of the user.

5. The system of claim 4, wherein the message includes a request for direct feedback from the user as to why the user discarded the first item from the search results.

6. The system of claim 1, further comprising an unopened-item monitor that collects information regarding which items were not opened by the user.

7. The system of claim 1, wherein the one or more items comprise any good, service, personal ad, event or employment.

8. The system of claim 1, wherein each item in the subset of items comprises the item location or geo-tag, a description of the item, and information to contact the item owner or seller.

9. The system of claim 1, wherein the item location comprises at least one of a city, state, street address, or zip code.

10. A method that facilitates improved efficiency when searching for items for sale on an online classifieds site comprising;

processing a query that is related to a search for an item posted on the classifieds site across a set of geo-tagged items and returns at least a subset of items in response to the query as a function of item location for a user to view;

examining, by a discard monitor, user historical behavior and activity with respect to at least one of previous searches, purchases, selected items, and expressly discarded items for the user;

marking one or more items in the at least a subset of items that are suitable for discard based at least in part on data collected by the discard monitor;

collecting data relating to discarded items; and communicating at least a portion of the collected data relating to discarded items to one or more owners of such items.

11. A system that facilitates improved efficiency when searching for items for sale on an online classifieds site comprising;

a processing unit for executing computer-executable instructions; and memory, in communication with the processing unit, containing computer-executable instructions for a system comprising:

a query component that processes a query that is related to a search for an item posted on the classifieds site across a set of geo-tagged items and returns at least a subset of items in response to the query as a function of item location for a user to view;

a discard monitor that examines user historical behavior and activity with respect to at least one of previous searches, purchases, selected items, and expressly discarded items for the user;

a discard component that marks one or more items that are suitable for discard based at least in part on data collected by the discard monitor; and a feedback component that provides implicit user feedback by collecting data relating to discarded items and communicating this data to one or more relevant owners of such items and that allows the owner of the first item to send a message to the user while hiding an email address associated with the user from the owner of the first item, wherein the message includes a request for direct feedback from the user as to why the user deleted the first item from the search results.

12. The method of claim 10, wherein the collected data comprises the discarded item and at least one of the following: username or email address of the user that discarded the item and a rate at which the item was explicitly discarded by users.

13. The method of claim 10 further comprising learning, by an AI component, one or more factors for discarding items for a particular user in party by comparing characteristics of the discarded items with those of any non-discarded items.

14. The method of claim 10, further comprising communicating a message from the owner to a user that discarded the item without revealing the username or email address of the user.

15. The method of claim 14, wherein the message includes a request for direct feedback from the user as to why the user discarded the item from the search results.

16. The method of claim 10, further comprising monitoring which items were not opened by the user.

17. The system of claim 10, wherein each item in the subset of items comprises the item location or geo-tag, a description of the item, and information to contact the item owner or seller.

18. The system of claim 10, wherein the item location comprises at least one of a city, state, street address, or zip code.

* * * * *